United States Patent
Wooley et al.

(10) Patent No.: US 7,322,695 B2
(45) Date of Patent: Jan. 29, 2008

(54) MULTIFOCAL CONTACT LENSES

(75) Inventors: C. Benjamin Wooley, Jacksonville, FL (US); Amitava Gupta, Roanoke, VA (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 11/389,798

(22) Filed: Mar. 27, 2006

(65) Prior Publication Data

US 2007/0222942 A1   Sep. 27, 2007

(51) Int. Cl.
*G02C 7/04* (2006.01)

(52) U.S. Cl. ........................... 351/161; 351/177
(58) Field of Classification Search ............ 351/160 R, 351/161, 177
See application file for complete search history.

(56) References Cited

U.S. PATENT DOCUMENTS

| | | | |
|---|---|---|---|
| 4,525,043 A | | 6/1985 | Bronstein |
| 4,580,882 A | * | 4/1986 | Nuchman et al. ........... 351/161 |
| 4,640,595 A | | 2/1987 | Volk |
| 5,220,359 A | | 6/1993 | Roffman |
| 5,619,289 A | | 4/1997 | Seidner et al. |
| 5,835,187 A | | 11/1998 | Martin |
| 5,880,809 A | | 3/1999 | Lieberman et al. |
| 6,379,008 B1 | | 4/2002 | Chateau et al. |
| 6,390,624 B1 | | 5/2002 | Hough |
| 2002/0036748 A1 | | 3/2002 | Chapoy et al. |
| 2006/0116764 A1 | * | 6/2006 | Simpson ..................... 623/6.23 |

FOREIGN PATENT DOCUMENTS

| | | |
|---|---|---|
| EP | 0822439 | 2/1998 |
| EP | 1331505 | 7/2003 |
| GB | 2139375 | 11/1984 |
| WO | WO 8700936 A1 | 2/1987 |
| WO | 00/54094 | 9/2000 |
| WO | WO 0151978 A1 | 7/2001 |

OTHER PUBLICATIONS

Carney, LG; Mainstone, JC; Henderson, BA, Invest. Ophthamol. Vis. Sci., vol. 38:2, pp. 311-320 (1997).
Strang, NC; Schmid, KL; Carney, LG, Curr. Eye Res., vol. 17:4, pp. 380-384(1998).
Llorente, L; Barbero, S; Cano, D.; Doronsoro, C; Marcos, SJ, J. Vis., vol. 4, pp. 288-298 (2004).

* cited by examiner

*Primary Examiner*—Scott J. Sugarman
*Assistant Examiner*—Darryl J. Collins
(74) *Attorney, Agent, or Firm*—Lois Gianneschi

(57) ABSTRACT

The invention provides methods for correcting presbyopia and lenses for such correction in which production of a full range of multifocal lenses is accomplished using three rotationally symmetric, aspheric back surfaces, the design of which base curves is a function of refractive power.

12 Claims, No Drawings

MULTIFOCAL CONTACT LENSES

FIELD OF THE INVENTION

The invention relates to contact lenses. In particular, the invention provides a range of stock-keeping units ("SKUs") for multifocal contact lens products using three, aspheric base curves for the entire SKU range.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is totally absent.

Among the methods used to correct for the eye's failure to accommodate is the use of the mono-vision contact lenses in which a person is fitted with one contact lens for distance vision and one lens for near vision. An alternative system provides both near and distance vision correction on each contact lens worn by the individual. As still another alternative, contact lenses in which at least one surface provides progressive power from far to near, or near to far, power are known.

The conventional contact lens product typically is produced using 1 to 3 base curves for the entire range of SKUs. This is disadvantageous in that the mismatch between the corneal curvature and the contact lens curve results in flexing of the lens on eye providing not only a poorly fitting lens, but also a lens in which the power on-eye experienced by the wearer is changed from the lens' prescribed power. Additionally, a tear film may form between the back surface of the lens and the corneal surface, which film is non-uniform in thickness and can cause additional power differences between prescribed and experienced power.

As an alternative, some contact lenses are designed using corneal topography in which lenses some or all of the back surface of the lens conforms to the shape of the corneal surface which it overlays. These lenses too are disadvantageous because of the expense entailed in providing lenses customized to an individual's corneal topography.

DETAILED DESCRIPTION OF THE INVENTION AND PREFERRED EMBODIMENTS

The invention provides methods for correcting visual acuity, lenses for such correction, and methods for producing the lenses of the invention. In a preferred embodiment, the method of the invention permits production of a full range of multifocal lenses using three rotationally symmetric, aspheric back surfaces, or base curves, the design of which base curves is a function of refractive power. The lenses of the invention will exhibit a better on-eye fit when compared to non-customized, conventional multifocal contact lenses. Additionally, the power on-eye the lens wearer will experience will be closer to the lens' prescribed power than that experienced in a conventional multifocal lens.

In one embodiment, the invention provides a method for designing a contact lens comprising, consisting essentially of, and consisting of the step of providing an aspheric, rotationally symmetric base curve that is a function of refractive error. In another embodiment, the invention provides a contact lens comprising, consisting essentially of, and consisting of: a.) a first surface having a first optic zone comprising, consisting essentially of, and consisting of at least one multifocal region; and b.) a second surface that is an aspheric, rotationally symmetric base curve that is a function of refractive error.

It is a discovery of the invention that certain generalities regarding the design of the base curve of a contact lens can be made, which generalities can be used to improve fit of lenses to the wearer's cornea while avoiding customizing the lens to an individual's cornea. In the method of the invention, either two or three base curves for a full range of multifocal lenses are provided, the curves being determined as function of refractive error. By "full range" means that the lenses provide correction for −12.00 to +12.00 diopters of distance correction and −3.00 to +3.00 diopters of near vision correction.

Certain studies have demonstrated that the human cornea is best modeled as a biconic in terms of an apical curvature and two aspheric constants measured orthogonally at $\theta$, and $\theta+\pi/2$ and 2. Additionally, it is known that the apical curvature of the cornea in a hyperopic eye is flatter and more spherical, meaning lower apical curvature and lower values of negative asphericity, than the apical curvature of in a myopic eye, which will have a higher curvature and higher level of negative asphericity. However, the magnitude of the difference between the two asphericity constants is typically small.

It is a discovery of the present invention that two or three concave, radially symmetric, aspheric curves can be calculated and used as base curves across a full range of multifocal contact lenses. Preferably, the curves are calculated using the equation:

$$z(\rho)=c\rho^2/(1+(1-\epsilon c^2\rho^2)^{1/2})$$

wherein z is the sag value as a function of the radius $\rho$;

$\rho$ is the radial position from the lens center;

c is the apical (vertex) curvature; and $\epsilon$ is the asphericity constant, which is related to the conic constant as $\kappa=\epsilon-1$.

Three, concave, radially symmetric aspheric curves are set forth in Table 1 below.

TABLE 1

| Sphere (diopters) | Apical Curvature (mm) | Asphericity Constant |
|---|---|---|
| About −12 to about −2 | 7.8 +/− 0.2 | −0.25 +/− 0.02 |
| About −2 to about +2 | 8.0 +/− 0.2 | −0.17 +/− 0.02 |
| About +2 to about +12 | 8.2 +/− 0.2 | −0.10 +/− 0.02 |

Alternatively, two base curves having the following apical curvatures and asphericity constants can be used:

TABLE 2

| Sphere (diopters) | Apical Curvature (mm) | Asphericity Constant |
|---|---|---|
| About −12 to about 0 | 7.8 +/− 0.2 | −0.25 +/− 0.02 |
| About 0 to about +12 | 8.2 +/− 0.2 | −0.10 +/− 0.02 |

The invention may be used to design and manufacture many types of contact lenses, but may find its greatest utility in the design and manufacture of multifocal contact lenses. Thus, the front surfaces of lenses of the invention may incorporate any of a number of multifocal corrections including, without limitation, bifocal and progressive correction.

In a preferred embodiment, the front surface of the lens has a central optic zone with at least two concentric annular zones of spherical power. The central optic zone may provide near or, preferably, distance optical power. By "distance optical power" and "near optical power" is meant the power required to correct the lens wearer's distance vision and near vision power, respectively. The power of one of the annular zones is substantially equal to that of the distance optical power and that of the other annular zone is substantially equal to that of the near vision power. The surface may have additional annular zones with distance optical power, near optical power, intermediate optical power, or power in a range between that of the distance and near optical power, or combinations thereof. For example, the surface may have three to five additional annular zones of alternating distance and near vision power.

Alternatively, the front surface optical zone may be a progressive power zone. By "progressive power zone" means a continuous, aspheric zone having a distance vision power region and a near vision power region, and a transition region of increasing or decreasing dioptric power connecting the distance and near regions. Additionally, the lenses of the invention may have any of a variety of corrective optical characteristics incorporated onto the surfaces in addition to distance and near optical powers, such as, for example, cylinder power.

Contact lenses useful in the invention may be either hard or, preferably, soft lenses. Soft contact lenses, made of any material suitable for producing such lenses, preferably are used. Illustrative materials for formation of soft contact lenses include, without limitation, silicone elastomers, silicone-containing macromers including, without limitation, those disclosed in U.S. Pat. Nos. 5,371,147, 5,314,960, and 5,057,578 incorporated in their entireties by reference, hydrogels, silicone-containing hydrogels, and the like and combinations thereof. More preferably, the surface is a siloxane, or contains a siloxane functionality including, without limitation, polydimethyl siloxane macromers, methacryloxypropyl siloxanes, and mixtures thereof, silicone hydrogel or a hydrogel. Illustrative materials include, without limitation, acquafilcon, etafilcon, genfilcon, lenefilcon, senofilcon, balafilcon, lotrafilcon, or galyfilcon.

The lenses of the invention may be formed by any conventional method. For example, the optic zones may be produced by diamond-turning the zones into the molds that are used to form the lens of the invention. Subsequently, a suitable liquid resin is placed between the molds followed by compression and curing of the resin to form the lenses of the invention. Alternatively, the zones may be diamond-turned into lens buttons. Any of a variety of known methods for the manufacture of multifocal contact lenses may be used to producer the lenses of the invention.

What is claimed is:

1. A method for designing a contact lens, comprising the step of providing an aspheric, rotationally symmetric base curve that is a function of refractive error, wherein the base curve is selected from the group consisting of a first surface having a sphere power of about −12 to about −2 diopters, an apical curvature of about 7.8+/−0.2 mm and an asphericity constant of about −0.25+/−0.02, a second surface having a sphere power of about −2 to about +2 diopters, an apical curvature of about 8.0+/−0.2 mm and an asphericity constant of about −0.17+/−0.02 and a third surface having a sphere power of about +2 to about +12 diopters, an apical curvature of about 8.2+/−0.2 mm and an asphericity constant of about −0.10+/−0.02.

2. The method of claim 1, further comprising the step of providing a front surface having a central optic zone comprising distance or near vision power and at least two concentric annular zones of power, each of the annular zones comprising distance or near vision power.

3. The method of claim 1, further comprising the step of providing a front surface having an optical zone that is a progressive power zone.

4. A method for designing a contact lens, comprising the step of providing an aspheric, rotationally symmetric base curve that is a function of refractive error, wherein the base curve is selected from the group consisting of a first surface having a sphere power of about −12 to about 0 diopters, an apical curvature of about 7.8+/−0.2 mm and an asphericity constant of about −0.25+/−0.02 and a second surface having a sphere power of about 0 to about +12 diopters, an apical curvature of about 8.2+/−0.2 mm and an asphericity constant of about −0.10+/−0.02.

5. The method of claim 4, further comprising the step of providing a front surface having a central optic zone comprising distance or near vision power and at least two concentric annular zones of power, each of the annular zones comprising distance or near vision power.

6. The method of claim 4, further comprising the step of providing a front surface having an optical zone that is a progressive power zone.

7. A contact lens, comprising: a.) a first surface having a first optic zone comprising a multifocal region; and b.) a second surface that is an aspheric, rotationally symmetric base curve that is a function of refractive error, wherein the base curve is selected from the group consisting of a first surface having a sphere power of about −12 to about −2 diopters, an apical curvature of about 7.8+/−0.2 mm and an asphericity constant of about −0.25+/−0.02, a second surface having a sphere power of about −2 to about +2 diopters, an apical curvature of about 8.0+/−0.2 mm and an asphericity constant of about −0.17+/−0.02 and a third surface having a sphere power of about +2 to about +12 diopters, an apical curvature of about 8.2 +/−0.2 mm and an asphericity constant of about −0.10+/−0.02.

8. The lens of claim 7, wherein the first surface comprises a central optic zone comprising distance or near vision power and at least two concentric annular zones of power, each of the annular zones comprising distance or near vision power.

9. The lens of claim 7, wherein the first surface comprises an optical zone that is a progressive power zone.

10. A contact lens, comprising: a.) a first surface having a first optic zone comprising a multifocal region; and b.) a second surface that is an aspheric, rotationally symmetric base curve that is a function of refractive error, wherein the base curve is selected from the group consisting of a first surface having a sphere power of about −12 to about 0 diopters, an apical curvature of about 7.8+/−0.2 mm and an asphericity constant of about −0.25+/−0.02 and a second surface having a sphere power of about 0 to about +12 diopters, an apical curvature of about 8.2+/−0.2 mm and an asphericity constant of about −0.10+/−0.02.

11. The lens of claim 10, wherein the first surface comprises a central optic zone comprising distance or near vision power and at least two concentric annular zones of power, each of the annular zones comprising distance or near vision power.

12. The lens of claim 10, wherein the first surface comprises an optical zone that is a progressive power zone.

* * * * *